(12) United States Patent
Todd et al.

(10) Patent No.: US 7,461,697 B2
(45) Date of Patent: Dec. 9, 2008

(54) METHODS OF MODIFYING PARTICULATE SURFACES TO AFFECT ACIDIC SITES THEREON

(75) Inventors: Bradley L. Todd, Duncan, OK (US); Keith A. Frost, Duncan, OK (US); Jimmie D. Weaver, Duncan, OK (US); Bessie Q. Citrowske, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 282 days.

(21) Appl. No.: 11/284,392

(22) Filed: Nov. 21, 2005

(65) Prior Publication Data
US 2007/0114030 A1 May 24, 2007

(51) Int. Cl.
E21B 43/267 (2006.01)
E21B 43/22 (2006.01)

(52) U.S. Cl. .............. 166/280.2; 166/294; 166/295; 166/305.1; 507/219; 507/234; 507/260; 507/269; 507/904; 507/924

(58) Field of Classification Search .......... 166/280.2, 166/294, 295, 305.1; 507/219, 234, 260, 507/269, 904, 924
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,836,465 A | 9/1974 | Rhudy et al. | |
| 3,868,998 A | 3/1975 | Lybarger et al. | 166/278 |
| 3,912,692 A | 10/1975 | Casey et al. | 260/78.3 |

(Continued)

FOREIGN PATENT DOCUMENTS

EP 0 510 762 A2 10/1992

(Continued)

OTHER PUBLICATIONS

U.S. Appl. No. 10/650,101, filed Aug. 26, 2003, Todd et al.

(Continued)

*Primary Examiner*—George Suchfield
(74) *Attorney, Agent, or Firm*—Robert A. Kent; Baker Botts LLC

(57) ABSTRACT

Methods comprising: providing a treatment fluid that comprises a base fluid and a least a plurality of coated particulates, the coated particulates having been treated with a surface modification agent and coated with a hydrolysable coating; placing the treatment fluid into a subterranean formation via a well bore. Also provided are methods comprising: treating a particulate with a surface modification agent; coating the particulate with a hydrolysable coating that has an initial degradation rate to produce a coated particulate; placing the particulate in a subterranean formation; and allowing the hydrolysable coating to degrade at a second degradation rate that is slower than its initial degradation rate.

22 Claims, 8 Drawing Sheets

U.S. PATENT DOCUMENTS

| | | | |
|---|---|---|---|
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 3,968,840 A | 7/1976 | Tate | 166/280.1 |
| 3,986,355 A | 10/1976 | Klaeger | |
| 3,998,272 A | 12/1976 | Maly | 166/281 |
| 3,998,744 A | 12/1976 | Arnold et al. | 507/269 |
| 4,010,071 A | 3/1977 | Colegrove | |
| 4,068,718 A | 1/1978 | Cooke, Jr. et al. | 166/280.2 |
| 4,074,536 A | 2/1978 | Young | 61/36 C |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,265,673 A | 5/1981 | Pace et al. | |
| 4,299,825 A | 11/1981 | Lee | |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | 252/8.55 R |
| 4,632,876 A | 12/1986 | Laird et al. | |
| 4,660,642 A | 4/1987 | Young | 166/280 |
| 4,670,501 A | 6/1987 | Dymond et al. | 524/458 |
| 4,681,165 A | 7/1987 | Bannister | 166/312 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,767,706 A | 8/1988 | Levesque | |
| 4,772,346 A * | 9/1988 | Anderson, Jr. et al. | 156/89.18 |
| 4,772,646 A | 9/1988 | Harms et al. | 524/27 |
| 4,785,884 A | 11/1988 | Armbruster | 166/280 |
| 4,793,416 A | 12/1988 | Mitchell | |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | 524/555 |
| 4,848,467 A | 7/1989 | Cantu et al. | 166/281 |
| 4,863,980 A | 9/1989 | Cowan et al. | |
| 4,886,354 A | 12/1989 | Welch et al. | 356/70 |
| 4,894,231 A | 1/1990 | Moreau et al. | |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,034,139 A | 7/1991 | Reid et al. | |
| 5,082,056 A | 1/1992 | Tackett, Jr. | 166/295 |
| 5,095,987 A | 3/1992 | Weaver et al. | 166/276 |
| 5,142,023 A | 8/1992 | Gruber et al. | 528/354 |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,627 A | 10/1993 | Harms et al. | 166/308 |
| 5,249,628 A | 10/1993 | Surjaatmadja | 166/305 |
| 5,251,697 A | 10/1993 | Shuler | |
| 5,278,203 A | 1/1994 | Harms | 523/200 |
| 5,295,542 A | 3/1994 | Cole et al. | 166/278 |
| 5,304,620 A | 4/1994 | Holtmyer et al. | |
| 5,314,031 A | 5/1994 | Hale et al. | |
| 5,325,923 A | 7/1994 | Surjaatmadja et al. | 166/308 |
| 5,330,005 A | 7/1994 | Card et al. | 166/280 |
| 5,335,166 A | 8/1994 | Stephenson | 364/166 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,492,177 A | 2/1996 | Yeh et al. | |
| 5,492,178 A | 2/1996 | Nguyen et al. | 166/276 |
| 5,496,557 A | 3/1996 | Feijen et al. | |
| 5,497,830 A | 3/1996 | Boles et al. | 166/300 |
| 5,499,678 A | 3/1996 | Surjaatmadja et al. | 166/298 |
| 5,501,274 A | 3/1996 | Nguyen et al. | 166/276 |
| 5,501,276 A | 3/1996 | Weaver et al. | |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,555,936 A | 9/1996 | Pirri et al. | |
| 5,582,249 A | 12/1996 | Caveny et al. | 166/276 |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | 507/204 |
| 5,607,905 A | 3/1997 | Dobson, Jr. et al. | 507/211 |
| 5,613,558 A | 3/1997 | Dillenbeck | |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,723,416 A | 3/1998 | Liao | |
| 5,765,642 A | 6/1998 | Surjaatmadja | 166/297 |
| 5,775,425 A | 7/1998 | Weaver et al. | 166/276 |
| 5,783,527 A | 7/1998 | Dobson, Jr. et al. | |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | |
| 5,833,000 A | 11/1998 | Weaver et al. | 166/276 |
| 5,839,510 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,871,049 A | 2/1999 | Weaver et al. | 166/276 |
| 5,893,416 A | 4/1999 | Read | 166/304 |
| 5,908,073 A | 6/1999 | Nguyen et al. | 166/276 |
| 5,916,849 A | 6/1999 | House | |
| 5,921,317 A | 7/1999 | Dewprashed et al. | 166/208 |
| 5,924,488 A | 7/1999 | Nguyen et al. | 166/280 |
| 5,960,878 A | 10/1999 | Nguyen et al. | 166/276 |
| 5,964,291 A | 10/1999 | Bourne et al. | 166/279 |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | 134/2 |
| 6,016,870 A | 1/2000 | Dewprashed et al. | 166/295 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,059,034 A | 5/2000 | Rickards et al. | 166/280 |
| 6,110,875 A | 8/2000 | Tjon-Joe-Pin et al. | |
| 6,114,410 A | 9/2000 | Betzold | 523/130 |
| 6,123,159 A | 9/2000 | Brookey et al. | |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | 507/222 |

| Patent No. | Date | Inventor | Class |
|---|---|---|---|
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,330,916 B1 | 12/2001 | Rickards et al. | 166/280 |
| 6,330,917 B2 | 12/2001 | Chatterji et al. | |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,422,326 B1 | 7/2002 | Brookey et al. | |
| 6,432,155 B1 | 8/2002 | Swazey et al. | |
| 6,439,309 B1 | 8/2002 | Materly et al. | 166/276 |
| 6,450,260 B1 | 9/2002 | James et al. | 166/277 |
| 6,454,003 B1 | 9/2002 | Chang et al. | 166/276 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 | 1/2003 | Vollmer | 507/236 |
| 6,527,051 B1 | 3/2003 | Reddy et al. | 166/300 |
| 6,534,449 B1 | 3/2003 | Gilmour et al. | 507/203 |
| 6,554,071 B1 | 4/2003 | Reddy et al. | 166/293 |
| 6,566,310 B2 | 5/2003 | Chan | |
| 6,569,814 B1 | 5/2003 | Brady et al. | 507/201 |
| 6,578,630 B2 | 6/2003 | Simpson et al. | |
| 6,599,863 B1 | 7/2003 | Palmer et al. | 507/219 |
| 6,667,279 B1 | 12/2003 | Hessert et al. | 507/225 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,691,780 B2 | 2/2004 | Nguyen et al. | |
| 6,702,023 B1 | 3/2004 | Harris et al. | 166/307 |
| 6,710,019 B1 | 3/2004 | Sawdon et al. | 507/136 |
| 6,716,797 B2 | 4/2004 | Brookey | |
| 6,737,385 B2 | 5/2004 | Todd et al. | |
| 6,761,218 B2 | 7/2004 | Nguyen et al. | 166/278 |
| 6,763,888 B1 | 7/2004 | Harris et al. | 166/305.1 |
| 6,764,981 B1 | 7/2004 | Eoff et al. | |
| 6,793,018 B2 | 9/2004 | Dawson et al. | 166/300 |
| 6,793,730 B2 | 9/2004 | Reddy et al. | |
| 6,806,235 B1 | 10/2004 | Mueller et al. | |
| 6,817,414 B2 | 11/2004 | Lee | 166/278 |
| 6,818,594 B1 | 11/2004 | Freeman et al. | |
| 6,837,309 B2 | 1/2005 | Boney et al. | 166/280.2 |
| 6,883,608 B2 | 4/2005 | Parlar et al. | |
| 6,896,058 B2 | 5/2005 | Munoz, Jr. et al. | 166/279 |
| 6,904,971 B2 | 6/2005 | Brothers et al. | |
| 6,949,491 B2 | 9/2005 | Cooke, Jr. | 507/219 |
| 6,959,767 B2 | 11/2005 | Horton et al. | |
| 6,978,838 B2 | 12/2005 | Parlar et al. | |
| 6,981,552 B2 | 1/2006 | Reddy et al. | |
| 6,983,801 B2 | 1/2006 | Dawson et al. | 166/300 |
| 6,987,083 B2 | 1/2006 | Phillippi et al. | |
| 6,997,259 B2 | 2/2006 | Nguyen | |
| 7,007,752 B2 | 3/2006 | Reddy et al. | |
| 7,021,377 B2 | 4/2006 | Todd et al. | |
| 7,032,663 B2 | 4/2006 | Nguyen | |
| 7,036,586 B2 | 5/2006 | Roddy et al. | |
| 7,036,587 B2 | 5/2006 | Munoz, Jr. et al. | |
| 7,044,220 B2 | 5/2006 | Nguyen et al. | |
| 7,044,224 B2 | 5/2006 | Nguyen | |
| 7,063,151 B2 * | 6/2006 | Nguyen et al. | 166/280.2 |
| 7,066,258 B2 | 6/2006 | Justus et al. | |
| 7,069,994 B2 | 7/2006 | Cooke, Jr. | |
| 7,080,688 B2 | 7/2006 | Todd et al. | 166/278 |
| 7,093,664 B2 | 8/2006 | Todd et al. | |
| 7,096,947 B2 | 8/2006 | Todd et al. | |
| 7,101,829 B2 | 9/2006 | Guichard et al. | |
| 7,131,491 B2 | 11/2006 | Blauch et al. | |
| 7,140,438 B2 | 11/2006 | Frost et al. | |
| 7,147,067 B2 | 12/2006 | Getzalf et al. | |
| 7,151,077 B2 | 12/2006 | Prud'homme et al. | |
| 7,156,174 B2 | 1/2007 | Roddy et al. | |
| 7,165,617 B2 | 1/2007 | Lord et al. | |
| 7,168,489 B2 | 1/2007 | Frost et al. | |
| 7,172,022 B2 | 2/2007 | Reddy et al. | |
| 7,178,596 B2 | 2/2007 | Blauch et al. | 166/280 |
| 7,195,068 B2 | 3/2007 | Todd | |
| 7,204,312 B2 | 4/2007 | Roddy et al. | |
| 7,219,731 B2 | 5/2007 | Sullivan et al. | 166/278 |
| 7,228,904 B2 | 6/2007 | Todd et al. | |
| 7,256,159 B2 | 8/2007 | Guichard et al. | |
| 7,261,156 B2 * | 8/2007 | Nguyen et al. | 166/276 |
| 7,264,051 B2 * | 9/2007 | Nguyen et al. | 166/276 |
| 7,267,170 B2 | 9/2007 | Mang et al. | |
| 7,303,014 B2 | 12/2007 | Reddy et al. | |
| 7,306,037 B2 | 12/2007 | Nguyen et al. | |
| 7,322,412 B2 | 1/2008 | Badalamenti et al. | |
| 2001/0016562 A1 | 8/2001 | Muir et al. | 507/201 |
| 2002/0036088 A1 | 3/2002 | Todd | 166/300 |
| 2002/0119169 A1 | 8/2002 | Angel et al. | |
| 2002/0125012 A1 | 9/2002 | Dawson et al. | 166/300 |
| 2003/0054962 A1 | 3/2003 | England et al. | |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0147965 A1 | 8/2003 | Bassett et al. | |
| 2003/0188766 A1 | 10/2003 | Banerjee et al. | 134/7 |
| 2003/0230407 A1 | 12/2003 | Vijn et al. | |
| 2003/0230408 A1 | 12/2003 | Acock et al. | 166/297 |
| 2003/0234103 A1 | 12/2003 | Lee et al. | 166/293 |
| 2004/0014606 A1 | 1/2004 | Parlar et al. | |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0055747 A1 | 3/2004 | Lee | 166/278 |
| 2004/0070093 A1 | 4/2004 | Mathiowitz et al. | |
| 2004/0094038 A1 | 5/2004 | Sullivan et al. | 166/308.1 |
| 2004/0099416 A1 | 5/2004 | Vijn et al. | |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0162386 A1 | 8/2004 | Altes et al. | |
| 2004/0170836 A1 | 9/2004 | Bond et al. | |
| 2004/0214724 A1 | 10/2004 | Todd et al. | |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0045328 A1 | 3/2005 | Frost et al. | 166/278 |
| 2005/0051330 A1 | 3/2005 | Nguyen | 166/276 |
| 2005/0051331 A1 * | 3/2005 | Nguyen et al. | 166/280.2 |

| | | |
|---|---|---|
| 2005/0056423 A1 | 3/2005 | Todd et al. .................. 166/278 |
| 2005/0059556 A1 | 3/2005 | Munoz, Jr. et al. .......... 507/103 |
| 2005/0059557 A1 | 3/2005 | Todd et al. .................. 507/110 |
| 2005/0059558 A1 | 3/2005 | Blauch et al. ............... 507/203 |
| 2005/0103496 A1 | 5/2005 | Todd et al. .................. 166/278 |
| 2005/0126780 A1 | 6/2005 | Todd et al. |
| 2005/0126785 A1 | 6/2005 | Todd |
| 2005/0130848 A1 | 6/2005 | Todd et al. |
| 2005/0161220 A1 | 7/2005 | Todd et al. |
| 2005/0183741 A1 | 8/2005 | Surjaatmadja et al. |
| 2005/0194135 A1* | 9/2005 | Nguyen et al. ............ 166/272.1 |
| 2005/0194136 A1* | 9/2005 | Nguyen et al. ............. 166/276 |
| 2005/0194137 A1* | 9/2005 | Nguyen et al. ............. 166/276 |
| 2005/0205266 A1 | 9/2005 | Todd et al. |
| 2005/0252659 A1 | 11/2005 | Sullivan et al. .......... 166/280.1 |
| 2005/0272613 A1 | 12/2005 | Cooke, Jr. ................... 507/219 |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen et al. |
| 2006/0105917 A1 | 5/2006 | Munoz, Jr. .................. 507/103 |
| 2006/0105918 A1 | 5/2006 | Munoz, Jr. et al. |
| 2006/0108150 A1 | 5/2006 | Luke et al. |
| 2006/0169182 A1 | 8/2006 | Todd et al. |
| 2006/0169450 A1 | 8/2006 | Mang et al. |
| 2006/0172891 A1 | 8/2006 | Todd et al. |
| 2006/0172894 A1 | 8/2006 | Mang et al. |
| 2006/0172895 A1 | 8/2006 | Mang et al. |
| 2006/0185847 A1 | 8/2006 | Saini et al. |
| 2006/0185848 A1 | 8/2006 | Surjaatmadja et al. |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener et al. ............ 166/300 |

FOREIGN PATENT DOCUMENTS

| | | | |
|---|---|---|---|
| EP | 0 879 935 | A2 | 11/1998 |
| EP | 0 879 935 | A3 | 2/1999 |
| EP | 1 132 569 | A2 | 12/2001 |
| EP | 1 413 710 | A1 | 4/2004 |
| GB | 2 412 389 | A | 3/2004 |
| WO | WO 93/15127 | A1 | 8/1993 |
| WO | WO 94/07949 | A1 | 4/1994 |
| WO | WO 94/08078 | A1 | 4/1994 |
| WO | WO 94/08090 | A1 | 4/1994 |
| WO | WO 95/09879 | A1 | 4/1995 |
| WO | WO 97/11845 | A1 | 4/1997 |
| WO | WO 99/27229 | | 6/1999 |
| WO | WO 00/57022 | | 9/2000 |
| WO | WO 01/02698 | | 1/2001 |
| WO | WO 01/87797 | A1 | 11/2001 |
| WO | WO 01/94744 | | 12/2001 |
| WO | WO 02/55843 | A1 | 1/2002 |
| WO | WO 02/12674 | A1 | 2/2002 |
| WO | WO 03/027431 | A2 | 4/2003 |
| WO | WO 03/027431 | A3 | 4/2003 |
| WO | WO 2004/007905 | | 1/2004 |
| WO | WO 2004/037946 | A1 | 5/2004 |
| WO | WO 2004/038176 | A1 | 5/2004 |
| WO | WO 2005/049493 | | 6/2005 |
| WO | WO 2005/085595 | | 9/2005 |
| WO | WO 2007057700 | | 5/2007 |

OTHER PUBLICATIONS

U.S. Appl. No. 10/768,323, filed Jan. 30, 2004, Roddy et al.
U.S. Appl. No. 10/768,864, filed Jan. 30, 2004, Roddy et al.
U.S. Appl. No. 10/769,490, filed Jan. 30, 2004, Roddy et al.
U.S. Appl. No. 10/783,207, filed Feb. 20, 2004, Surjaatmadja et al.
U.S. Appl. No. 10/802,340, filed Mar. 17, 2004, Reddy et al.
U.S. Appl. No. 10/803,668, filed Mar. 17, 2004, Todd et al.
U.S. Appl. No. 10/803,689, filed Mar. 18, 2004, Todd et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/897,509, filed Jul. 23, 2004, Pauls et al.
U.S. Appl. No. 10/915,024, filed Aug. 10, 2004, Nguyen.
U.S. Appl. No. 10/932,749, filed Sep. 2, 2004, Harris et al.
U.S. Appl. No. 10/933,705, filed Sep. 3, 2004, Kalman.
U.S. Appl. No. 10/950,072, filed Sep. 24, 2004, Nguyen et al.
U.S. Appl. No. 10/991,228, filed Nov. 17, 2004, Munoz, Jr. et al.
U.S. Appl. No. 10/991,248, filed Nov. 17, 2004, Munoz, Jr. et al.
U.S. Appl. No. 11/046,043, filed Jan. 28, 2005, Todd et al.
U.S. Appl. No. 11/046,652, filed Jan. 28, 2005, Todd et al.
U.S. Appl. No. 11/047,876, filed Jan. 31, 2005, Mang et al.
U.S. Appl. No. 11/048,417, filed Jan. 31, 2005, Mang et al.
U.S. Appl. No. 11/049,464, filed Feb. 2, 2005, Mang et al.
U.S. Appl. No. 11/049,483, filed Feb. 2, 2005, Mang et al.
U.S. Appl. No. 11/049,600, filed Feb. 2, 2005, Mang et al.
U.S. Appl. No. 11/049,601, filed Feb. 2, 2005, Mang et al.
U.S. Appl. No. 11/062,943, filed Feb. 22, 2005, Saini et al.
U.S. Appl. No. 11/062,956, filed Feb. 22, 2005, Surjaatmadja et al.
U.S. Appl. No. 11/147,093, filed Jun. 7, 2005, Todd et al.
U.S. Appl. No. 11/128,060, filed May 12, 2005, Saini.
U.S. Appl. No. 11/127,583, filed May 12, 2005, Saini.
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Y. Chiang et al., *Hydrolysis Of Ortho Esters; Further Investigation Of The Factors Which Control The Rate-Determining Step*, Engineering Information, Inc. NY, NY, vol. 105, No. 23 (XP-002322842), Nov. 16, 1983.
M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.
Skrabal et al, *The Hydrolysis Rate Of Orthoformic Acid Ethyl Ether*, Chemical Institute of the University of Graz, Jan. 13, 1921, pp. 1-38, Jan. 13, 1921.
Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

Attia, Yosry et al, *Adsorption Thermodynamics of a Hydrophobic Polymeric Flocculant on Hydrophobic Colloidal Coal Particles*, Langmuir 1991, 7, pp. 2203-2207, Apr. 8, 1991.

Foreign Search Report and Written Opinon of International Application No. PCT/GB2006/004322 Mailed on Mar. 23, 2007 and Filed on Nov. 20, 2006.

Kiyoshi Matsuyama et al, Environmentally benign formation of polymeric microspheres by rapid expansion of supercritical carbon dioxide solution with a nonsolvent, Environ Sci Technol 2001, 35, 4149-4155.

* cited by examiner

METHODS OF MODIFYING PARTICULATE SURFACES TO AFFECT ACIDIC SITES THEREON

BACKGROUND

The present invention relates to modifying the mineral surface of particulates (including proppants such as sand or synthetic particulates) that are particularly suitable for use in subterranean operations such as gravel packing and fracturing. More particularly, this invention relates to modifying the mineral surfaces of particulates to affect the hydrolysis behavior of hydrolysable coatings thereon.

Particulates of various kinds, and particularly sand, are utilized routinely in carrying out operations in subterranean formations penetrated by well bores. For example, particulates are used for forming gravel packs adjacent well bores, for propping open fractures in a subterranean formation, as structural fillers in cement compositions utilized in well bores and subterranean formations, etc. The formation of a gravel pack adjacent a well bore penetrating a producing formation may cause migrating particulates from produced fluids to be screened out of the fluids thereby preventing plugging of flow passageways, damage to tubular goods and other equipment, etc. In carrying out treatments in subterranean formations whereby fractures are created in the formations to create flow channels therein, solid particulates, referred to as proppant, are commonly placed in the fractures to prevent their closure after fracturing fluid pressure reduction. A variety of other treatments and procedures are carried out in well bores and subterranean formations penetrated thereby using cement compositions, which may include particulates as fillers.

Fairly recently, it has been discovered that such particulates may be coated with hydrolytically degradable materials that may, for instance, produce an acid upon degradation. Such coated particulates may be used in a gravel pack neighboring a filter cake, for example. When the degradable material coating degrades, the acid that is produced may interact with an acid soluble component of the filter cake so as to degrade the filter cake. Another example of a subterranean application wherein such coated particulates are used is breaking (e.g., reducing the viscosity of) a viscosified treatment fluid (e.g., a fracturing fluid or a gravel pack fluid). The acid released by the degradable material upon degradation may assist in breaking the fluid. Examples of such degradable materials include esters, orthoesters, and polyorthoesters. Esters offer the functionality of being delayed release acids; the acids produced can be used downhole for a variety of purposes (e.g., degrading an acid soluble portion of a filter cake or breaking a fluid). Orthoesters and polyorthoesters are believed to be beneficial because they may offer the functionality of a chemical "trigger" for a delayed release acid, meaning that the material can remain inactive for long periods of time, and then become activated at a desired time, oftentimes strongly.

Although using particulates coated with coatings that comprise esters, orthoesters, or polyorthoesters may provide an advantageous means of providing their degradation products to a subterranean formation, it has been found that such particulates may have acidic sites on their mineral surfaces that may catalyze the hydrolysis of the coatings, causing them to hydrolyze prematurely. The acidic sites are thought to be due, at least in part, to the presence of dangling —OH groups on the surface of the particulates that form hydroxyl groups in water; these hydroxyl groups can be acidic. In some instances, these dangling —OH groups may form silic acid with water. Premature hydrolysis of the esters, orthoesters and polyorthoesters is undesirable, inter alia, because it can undermine the purpose for which these coatings are being used. For example, if these are used in a fluid loss control pill, the pill may degrade prematurely, and therefore, not prevent fluid loss as desired. Additionally, premature hydrolysis can undermine the desirable chemical trigger aspect of orthoesters and polyorthoesters. To achieve a delayed hydrolysis, it may be necessary to affect the acidic sites on the particulates so that they do not catalyze the hydrolysis of the coatings on the particulates, for example, by neutralizing them or by making them slightly basic.

SUMMARY

The present invention relates to modifying the mineral surface of particulates (including proppants such as sand or synthetic particulates) that are particularly suitable for use in subterranean operations such as gravel packing, and fracturing. More particularly, this invention relates to modifying the mineral surfaces of particulates to affect the hydrolysis behavior of hydrolysable coatings thereon.

In one embodiment the present invention provides a method comprising: providing a treatment fluid that comprises a base fluid and a least a plurality of coated particulates, the coated particulates having been treated with a surface modification agent and then coated with a hydrolysable coating; placing the treatment fluid into a subterranean formation via a well bore.

In another embodiment the present invention provides a method comprising: treating a particulate with a surface modification agent; coating the particulate with a hydrolysable coating that has an initial degradation rate to produce a coated particulate; placing the particulate in a subterranean formation; and allowing the hydrolysable coating to degrade at a second degradation rate that is slower than its initial degradation rate.

In another embodiment, the present invention provides a method comprising: providing a fracturing fluid that comprises a base fluid and a least a plurality of coated particulates, the coated particulates having been treated with a surface modification agent and coated with a hydrolysable coating; placing the fracturing fluid into a subterranean formation via a well bore at a pressure sufficient to create or enhance a fracture in the subterranean formation; and allowing the coated particulates to be placed in or around the fracture.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
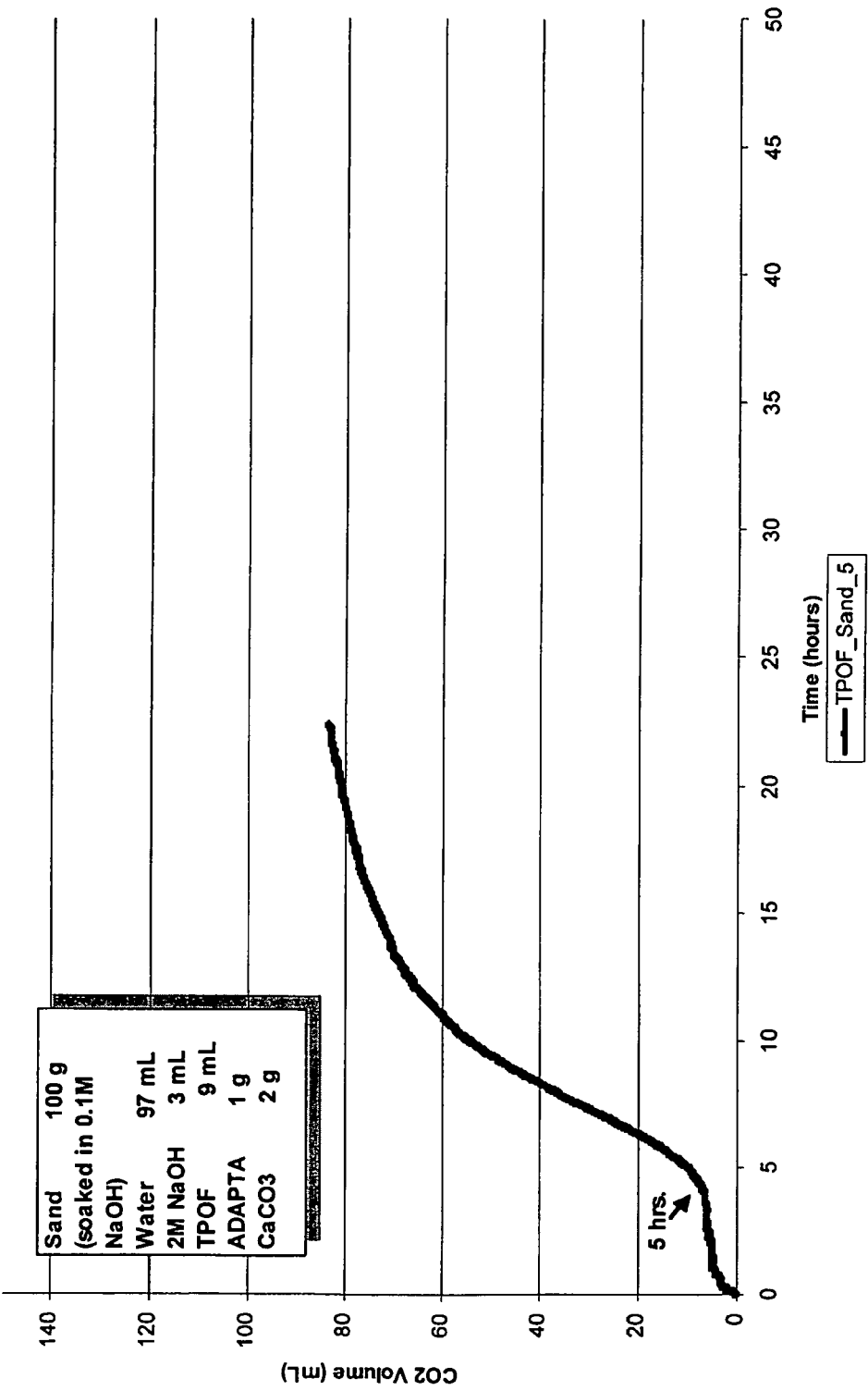
FIG. 1 is a graph depicting $CO_2$ production over time.

The present invention relates to modifying the mineral surface of particulates (including proppants such as sand or synthetic particulates) that are particularly suitable for use in subterranean operations such as gravel packing, and fracturing. More particularly, this invention relates to modifying the mineral surfaces of particulates to affect the hydrolysis behavior of hydrolysable coatings thereon. The hydrolysis of orthoester or polyorthoester coatings may be catalyzed by acids rather than bases. If the coating comprises an ester, then its hydrolysis may be catalyzed by acids or bases. Thus, these acidic sites can be catalysts for their hydrolysis. By modifying these acidic sites, the undesirable impact of such acidic sites on the hydrolysis of a hydrolysable coating on the particulates may be reduced. In some embodiments of the invention, the surface modifying agents of the present invention may either at least partially neutralize the acidic sites or make the acidic sites more basic so that the hydrolysis of the hydrolysable coatings on the particulates is not catalyzed to the same extent as it would be if the particle were not so treated. As a result, the hydrolysable coating should hydrolyze at a slower rate than if the acidic sites on the particulates were not so treated.

The methods of the invention include treating a particulate with a surface modification agent, and then coating the particulate with a hydrolysable coating to produce a "coated particulate." This coated particulate can be introduced into a subterranean formation, for example, into a fracture in a subterranean formation. The term "surface modification agent" as used herein refers to a compound or a combination of compounds that are capable of affecting acidic sites on the surface of particulates in such a way that the effect such sites may have on the hydrolysis of a hydrolysable coating placed on the particulate is either neutralized or retarded. The terms "coating" or "coated" and their derivatives as used herein do not imply any particular degree of coating on the particulate; in particular, the terms "coat" or "coating" do not imply 100% coverage by the coating on the particulate. The term "coated particulate" as used herein refers to a particulate that has been treated with a surface modification agent as described herein and then coated with a hydrolysable coating.

The particulates suitable for use in the present invention include any particulate that has an acidic site on its surface that may affect hydrolysis of a hydrolysable coating on the particulate. Examples of suitable particulate materials may include, but are not limited to, sand, bauxite, ceramic materials, glass materials (e.g., glass beads), polymer materials, cured resinous particulates comprising nut shell pieces, cured resinous particulates comprising seed shell pieces, cured resinous particulates comprising fruit pit pieces, and combinations thereof. Composite particulates may also be suitable; suitable composite materials may comprise a binder and a filler material. Suitable filler materials include silica, alumina, fumed carbon, carbon black, mica, titanium dioxide, kaolin, talc, zirconia, fly ash, hollow glass microspheres, solid glass, and combinations thereof. Typically, the particulates have a size in the range of from about 2 to about 400 mesh, U.S. Sieve Series. A preferred size range is from about 8 mesh to about 70 mesh. Most preferred may be 20/40 mesh. It should be understood that the term "particulate," as used in this disclosure, includes all known shapes of materials including substantially spherical materials, fibrous materials, platelets, polygonal materials (such as cubic materials), and mixtures thereof. Moreover, fibrous materials that may or may not be used to bear the pressure of a closed fracture are often included in proppant and gravel treatments. In embodiments of the present invention wherein the particulates are used in conjunction with a treatment fluid, the particulate material may be present in the treatment fluid in any amount that the treatment fluid is capable of suspending, and in an amount desired to accomplish the task at hand. In certain embodiments, the particulate material may be present in a treatment fluid in an amount in the range of from about 0.5 ppg to about 18 ppg of the treatment fluid.

The surface modification agents used in the present invention include any compound or a combination of compounds that are capable of affecting the acidic sites on the surfaces of particulates in such a way as to alter the effect of these sites on the hydrolysis of a hydrolysable coating placed thereon.

One example of a surface modification agent is a sodium hydroxide solution. In some embodiments, the sodium hydroxide solution may be used in a range of from about 0.01% to about 50% solution. The overall amount used is relatively not all that important; rather, the more important factor is the total neutralizing power of the sodium hydroxide solution. Enough of the sodium hydroxide solution should be used to adequately treat the acidic sites on the particulate surfaces so as to retard or neutralize the catalytic effect of the sites on a hydrolysable coating on the particulate. One of ordinary skill in the art with the benefit of this disclosure will be able to determine this amount by neutralization (e.g., by titration) of the particulates. In one embodiment, the amount of sodium hydroxide solution used per gram of particulates is 1 ml of 0.1 Molar solution. One method to treat the particulates is to soak the particulates in a sodium hydroxide solution for a chosen amount of time, for example, overnight.

In some embodiments, the acidic site modifier is a solution that comprises a acidic site modifying compound and, optionally, a solvent. A solvent may be used, for example, to thin the acidic site modifying compound. In some instances, this may be desirable; it others, it may unnecessary (e.g., when the acidic site modifying compound has a sufficiently low viscosity). A preferred type of an acidic site modifying compound is an organosilicon compound. Preferred organosilicon compounds are organosilanes. The organosilicon compounds that may be used in the methods of the present invention are those that have a hydrophobic group and a silica bonding group. It is believed that the hydrophobic group is able to interact (e.g., bond) with the surface of the particulates so as to make them more neutral or basic. Silicon is thought to have a valence of 4, and the formulae shown herein are intended to have the number of radicals necessary to satisfy that valence.

The organosilicon compounds useful in the present invention should possess one or more groups that are capable of chemically interacting with the acidic sites on the surfaces of the particulates so as to make them more neutral or more basic. Examples of suitable organofunctional silanes include aminofunctional silanes, ureidofunctional silanes, and epoxyfunctional silanes. Particularly preferred organofunctional silanes are the aminofunctional silanes. Examples of suitable aminofunctional silanes that may be particularly suitable include gamma-aminopropyltriethoxysilane, N-beta-aminoethyl-gamma-aminopropyltrimethoxysilane, and aminoethyl-N-beta-(aminoethyl)-gamma-aminopropyltrimethoxysilane. Other suitable aminofunctional silanes may include (which are all available from Dow Corning, at various locations, or by emailing specialtychemicals@dowcorning.com): aminopropyltrimethoxysilane; aminopropyltriethoxysilane; aminopropylmethyldiethoxysilane; a hydrolyzate of aminopropylmethyldiethoxysilane; m-aminophenyltrimethoxysilane;

phenylaminopropyltrimethoxysilane; 1_1_2_4-tetramethyl-1-sila-2-azacyclopentane; aminoethylaminopropyltrimethoxysilane; aminoethylaminopropyltrimethoxysilane; aminoethylaminopropyltriethoxysilane; aminoethylaminopropylmethyldimethoxysilane; aminoethylaminoisobutylmethyldimethoxysilane; aminoethylaminoisobutylmethyldimethoxysilane hydrolyzate; trimethoxysilylpropyldiethylenetriamine; vinylbenzylethylenediaminepropyltrimethoxysilanemonohydrochloride, 60% methanol; vinylbenzylethylenediaminepropyltrimethoxysilane, 66% methanol; vinylbenzylethylenediaminepropyltrimethoxysilane, 66% methanol; benzylethylenediaminepropyltrimethoxysilane monohydrochloride, 50% methanol; benzylethylenediaminepropyltrimethoxysilane, 50% methanol; allylethylenediaminepropyltrimethoxysilane monohydrochloride, 50% methanol; benzylethylenediaminepropyltrimethoxysilane, 50% methanol; allylethylenediaminepropyltrimethoxysilane monohydrochloride, 60% methanol; (triethyoxysilylpropyl)urea, 8% methanol; (triethoxysilylpropyl)urea, 50% methanol; and (triethoxysilylpropyl)urea, 8% ethanol. An example of a suitable ureidofunctional silane is gamma-ureidopropyl-triethoxysilane, which may have the chemical formula:

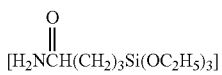

Examples of suitable epoxyfunctional silanes are beta-(3-4-epoxy-cyclohexyl)ethyltrimethoxysilane and gamma-glycidoxypropyl-trimethoxysilane, which may have the chemical formulas, respectively:

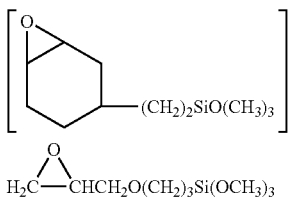

Other examples of epoxyfuncational silanes that may be suitable for use in the present invention include the following also available from Dow Corning at specialtychemicals@dowcorning.com: glycidoxypropyltrimethoxysilane; glycidoxypropyltriethoxysilane; glycidoxypropylmethyldimethoxysilane; glycidoxypropylmethyldiethoxysilane; epoxycyclohexylethyltrimethoxysilane; and epoxysilane-modified melamine.

Other suitable classes of organosilicon compounds that may be used in this invention include organohalogen silanes, organosilane esters, silyl acetamides, cyclosiloxanes, cyclosilazanes, and silazanes. Some organosilicon compounds are described by the following four formulae, with specific examples of each class following the formulae descriptions.

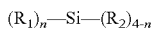      Formula 1 wherein each $R_1$ is independently a hydrocarbon composed of alkyl, cycloalkyl, alkenyl, cycloalkenyl and aryl radicals or combinations thereof containing up to about 18 carbons atoms; each $R_2$ is independently a halogen radical, —$OR_3$ or —OH; each $R_3$ is independently a hydrocarbon composed of alkyl radicals, aryl radicals, or combinations thereof containing up to about 10 carbon atoms; an n is an integer equal to about 1 to about 3. Specific examples include trihexylchlorosilane, triphenylchlorosilane, trimethylchlorosilane, dimethyldichlorosilane, phenyltrichlorosilane, methylvinyl dichlorosilane, octadecyltrichlorosilane, triethylbromosilane, triethylfluorosilane, vinyl triethoxysilane, amyltriethoxysilane, dimethyldiethoxysilane, phenyltriethoxysilane, methylphenyldimethoxysilane, trimethylethoxysilane, 7-octenyltrimethoxysilane, octadecyltriedthoxysilane, bis-(cycloheptenyl)methyldichlorosilane, bis-(cycloheptenyl)triethoxysilane, benzyltriethoxysilane, diphenylsilanediol, etc. A preferred example is Siliquest® A-1120, which is commercially available from GE Silicones—OSi Specialties.

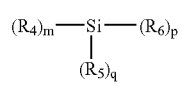      Formula 2 wherein $R_4$ is independently equal to $R_1$; each $R_5$ is independently a halogen radical; each $R_6$ is independently —$N_3$, —NH—Si—$(R_4)_3$, or —N($CH_3$)—Si—$(R_4)_3$; m is an integer that is about 2 to about 3; q is an integer that is about 0 to 1; p is an integer that is about 1 to about 2; and m+q+p=4. Specific examples include hexamethyldisilazane, azidotrimethylsilane, methylphenyldiazidosilane, hexaphenyldisilazane, heptamethyldisilazane, dimethyldiaziododisilane, triphenylsilazide, diphenyldiazidosilane, etc.

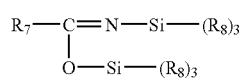      Formula 3 wherein $R_7$ is independently equal to $R_1$ or $R_5$; and each $R_8$ is independently equal to $R_3$ or a hydrogen radical with at least one $R_8$ equal to $R_3$. Specific examples include bis-(trimethylsilyl)acetamide, bis-(dimethylsilyl)acetamide, N-Methyl-N-trimethylsilylacetamide, etc.

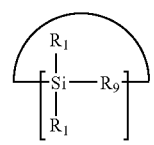      Formula 4 wherein $R_9$ is —O— or —NH—, and x is an integer that is about 3 to about 4. Specific examples are octamethylcyclotetrasiloxane and octamethylcyclotetrasilazane, hexamethylcyclotrisilazane, hexamethylcyclotrisiloxane, 2,2-dimethyltetraphenylcyclotrisiloxane, hexaphenylcyclotrisiloxane, octaphenylcyclotetrasiloxane, etc. One skilled in the art will recognize other compounds that would be suitable that correspond to one of the above formulae and any derivatives of such compounds.

As discussed above, solvents may be used, for example, to thin the acidic site modifying compound or for other reasons. With organosilicon acidic site modifying compounds, using a suitable solvent is preferred. Suitable solvents for the acidic site modifying compounds include any organic solvent that will not negatively react with the acidic site modifying compound. Examples for organosilicon acidic site modifying compounds include any non-protic solvent that has low enough reactivity such that it will not react with the organosilicon compound negatively at normal conditions. Specific examples include, but are not limited to glycol ethers, other oxygenated solvents, low alcohols, methanol, low esters, and ketones. One of ordinary skill in the art with the benefit of this disclosure will be able to choose an appropriate solvent for a chosen acidic site modifying compound. As little as possible of the solvent should be used to adequately distribute the acidic site modifying compound onto the particulates to the desired degree. In some embodiments, this may range from about 10% to about 90% based on the amount of organosilicon compound present. This amount can vary depending on the actual application and mechanical application methods used. The appropriate amount of solvent to use is determinable by one skilled in the art with the benefit of this disclosure.

Materials that may be used in the hydrolytically degradable coatings of the present invention include hydrolytically degradable polymers. Such degradable polymers are capable of undergoing an irreversible degradation downhole. The term "irreversible" as used herein means that the degradable polymer should degrade in situ (e.g., within a well bore) but should not recrystallize or reconsolidate in situ after degradation (e.g., in a well bore). The terms "degradation" or "degradable" refer to both the two relatively extreme cases of hydrolytic degradation that the degradable material may undergo, e.g., heterogeneous (or bulk erosion) and homogeneous (or surface erosion), and any stage of degradation in between these two. This degradation can be a result of, inter alia, a chemical or thermal reaction, or a reaction induced by radiation. The terms "polymer" or "polymers" as used herein do not imply any particular degree of polymerization; for instance, monomers and oligomers are encompassed within this definition. The degradability of a polymer depends at least in part on its backbone structure. For instance, the presence of hydrolysable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Nonlimiting examples of degradable polymers that may be used as the hydrolysable coatings in the present invention include, but are not limited to, aliphatic polyesters; poly(lactides); poly(glycolides); poly(ε-caprolactones); poly(hydroxybutyrates); polyanhydrides; aliphatic polycarbonates; orthoesters; poly(orthoesters); poly(amides); poly(urethanes); poly(hydroxy ester ethers); poly(phosphazenes); and derivatives and combinations thereof. Other degradable polymers that are subject to hydrolytic degradation also may be suitable. One's choice may depend on the particular application and the conditions involved. Other guidelines to consider include the degradation products that result, the time for required for the requisite degree of degradation, and the desired result of the degradation. Of these suitable polymers, orthoesters and polyorthoesters are preferred.

Aliphatic polyesters degrade chemically, inter alia, by hydrolytic cleavage. Hydrolysis can be catalyzed by either acids or bases. Generally, during the hydrolysis, carboxylic acid end groups are formed during chain scission, and this may enhance the rate of further hydrolysis. This mechanism is known in the art as "autocatalysis," and is thought to make polyester matrices more bulk eroding. Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to no particular method as to how the polymer was made, for example, from lactides, lactic acid, or oligomers, and carries no implicit reference to the degree of polymerization or level of plasticization.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of suitable degradable polymer that may be useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

In some preferred embodiments, the hydrolysable coating on the particulates may comprise an orthoester or a polyorthoester. Such coatings may be referred to herein as "orthoester coating(s)." Examples of suitable orthoesters have a structure defined by the formula: $RC(OR')(OR'')(OR''')$, wherein $R'$, $R''$, and $R'''$ are not hydrogen and $R'$, $R''$, and $R'''$ may or may not be the same group. $R'$, $R''$, or $R'''$ may comprise a heteroatom that may affect the solubility of the chosen orthoester in a given application. Suitable heteroatoms could include nitrogen or oxygen. Some suitable poly(orthoesters) are described in an article entitled, *Poly(orthoesters)—From Concept to Reality, Biomacromolecules*, Vol 5, 1625 (2004), and some of the references cited therein, which is incorporated herein by reference. Examples of suitable orthoesters and poly(orthoesters) include, but are not limited to, orthoacetates, such as trimethyl orthoacetate, triethyl orthoacetate, tripropyl orthoacetate, triisopropyl orthoacetate, tributyl orthoacetate, and poly(orthoacetates); orthoformates, such as trimethyl orthoformate, triethyl orthoformate, tripropyl orthoformate, triisopropyl orthoformate, tributyl orthoformate, and poly(orthoformates); and orthopropionates, such as trimethyl orthopropionate, triethyl orthopropionate, tripropyl orthopropionate, triisopropyl orthopropionate, tributyl orthopropionate, and poly(orthopropionates). Suitable orthoesters also may be orthoesters of polyfunctional alcohols, such as glycerin and/or ethylene glycol. In choosing an orthoester, one should be mindful that some orthoesters have low flash points. Various derivatives can be synthesized by transesterification of the above mentioned orthoesters with variety of alcohols, sugars, or polyols. One should be mindful that to synthesize these molecules, preferably there should not be any free alcohol groups left after the synthesis, which can further transesterify and possibly alter the molecule. Depending on the desired application, the orthoesters or the poly(orthoesters) may be water soluble, water insoluble, or solid. Generally speaking, water soluble orthoesters are easy to hydrolyze at lower temperature in comparison to water insoluble orthoesters. By making an orthoester or a polyorthoester more hydrophobic (e.g., through appropriate derivatization techniques), the orthoester may be more suitable for use in higher temperature applications. Also, poly(orthoesters) made by glycerol and trimethyl orthoformate are water soluble depending on the number of repeating units and can be used for lower temperature applications. One of the advantages of having a polyorthoester over an orthoester is that it has a higher flash point and a higher viscosity. Similarly, hydrophobic polyorthoesters may be synthesized, which are suitable for higher temperature applications. The choice of which particular orthoester or polyorthoester to use should be guided by such considerations as environmental factors. Additionally, orthoesters may be recognized as ethers based upon their chemical structure in view of their lack of base catalyzed hydrolysis.

In choosing the appropriate degradable polymer, one should consider the degradation products that will result. These degradation products should not adversely affect other operations or components in the well bore. The choice of degradable polymer also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications.

If the application in which the degradable material will be used does not contain a component that will enable the degradable polymer to degrade, e.g., in a dry gas hole, then the necessary component may need to be provided. For instance, if water is needed, but a sufficient amount is not present within the well bore, water may need to be added. For example, to allow the orthoester or polyorthoester to hydrolyze to produce an acid, a source of water is usually needed. The water should be present in an amount from about 2 moles of water for about every 1 mole of orthoester to an excess of water. For polyorthoesters, this is based upon the moles of the orthoester repeating units available for reaction. One of ordinary skill in the art with the benefit of this disclosure will be able to determine whether water or another suitable component will need to be added to allow the hydrolysable coating to degrade.

In a preferred embodiment, the degradable polymer be viscosified before placing it on the particulates, e.g., if the coating will not adhere to the particulates to a satisfactory degree. Examples of suitable viscosifying agents may be any viscosifier that has a protic group, methylstyrene/acrylate copolymers, polyacrylamides, polyvinylacrylate, polyols, polyethylene oxides that are terminated with a methoxy group, glycol ethers, ADAPT HP (methyl styrene acrylate copolymer), (which is available from Halliburton Energy Services, various locations), and polystyrenes. The amount of viscosifier that may be used may range from about 1% up to about 40%. Preferred, for example, for polystyrene is about 24% w/w; for ADAPTA HP the amount preferred may be about 10% w/w. The amount used may depend on the average molecular weight of the polymer.

In other embodiments of the present invention, the hydrolysable coating may be adhered to the particulates with a tackifying agent. One type of tackifying agent suitable for use in the present invention is a non-aqueous tackifying agent. A particularly preferred group of suitable tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

In one example of a method of this invention, an acidic site modifying compound is optionally combined with a solvent to form a surface modification agent. The surface modification agent is then combined with suitable particulates. A hydrolysable coating is then applied to the particulates.

In one embodiment of a method of the present invention, the surface modification agent may include they hyrolyzable coating material that then coats the particulate; in other words, they may be applied in the same application.

In a preferred embodiment, a particulate is treated with an organosilicon-based surface treating agent before an orthoester coating is placed on the particulate. In a more preferred embodiment, a particulate is treated with a solution comprising an organosilicon-based surface treating agent and an orthoester or polyorthoester.

In some embodiments, the mixing of the components can be by batch mixing or the two components can be metered through a static mixer to obtain a homogeneous mixture before being coated on particulates while they are conveyed in a sand screw. In some embodiments, the coated particulates may be coated off-site and transported to a job. In other embodiments, the particulates may be treated and coated on-site, e.g., on-the-fly. In some embodiments of the present invention, the particulates may be coated at the well-site. In an example of such a method, the particulates may be placed in a sand screw, and then the surface modifying agent and the orthoester or polyorthester coating material may be added to the sand screw. Upon exiting the sand screw, the coated particulates may be added to a treatment fluid to be used in a downhole application, such as fracturing or gravel packing. U.S. Pat. No. 5,335,166, which is assigned to Halliburton Energy Services and incorporated herein by reference, describes a method of operating a sand screw.

The treatment fluids utilized in the methods of the present invention may comprise any treatment fluid suitable for any subterranean treatment known and practiced in the art, including, but not limited to, pre-pad treatments, fracturing operations, gravel-packing operations, frac-packing operations, perforation operations, and the like. Suitable treatment fluids may take on a variety of physical forms, including aqueous gels, viscoelastic surfactant gels, oil gels, foamed gels, and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In certain embodiments of the present invention, the treatment fluids are aqueous gels comprised of water, a gelling agent for gelling the water and increasing its viscosity, and, optionally, a crosslinking agent for crosslinking the gel and further increasing the viscosity of the treatment fluid. The increased viscosity of the gelled, or gelled and cross-linked, treatment fluid, inter alia, may reduce fluid loss and/or allow the treatment fluid to transport increased quantities of proppant particulates. The treatment fluids utilized in the methods of the present invention optionally may comprise one or more of a variety of well-known additives, such as gel stabilizers, breakers, fluid loss control additives, acids, corrosion inhibitors, catalysts, clay stabilizers, biocides, salts, friction reducers, surfactants, solubilizers, pH adjusting agents, additives for preventing gas hydrates (e.g., ethylene glycol, methanol), and the like.

The coated particulates may be used for any purpose downhole including as proppant particulates in a fracturing operation, gravel particulates in a gravel packing operation, and the like. The coating ultimately will hydrolyze downhole to produce an acid that can be beneficial. For example, the produced acid may be used to degrade an acid soluble component downhole (e.g., a portion of a filter cake, a portion of a tool, etc.), or to break a viscosified treatment fluid. Examples of uses of orthoesters may be found in U.S. patent application Ser. No. 11/062,956 filed on Feb. 22, 2005, published on Aug. 24, 2006 as U.S. Patent Application Publication No. 2006/0185848, the disclosure of which is incorporated by reference.

To facilitate a better understanding of the present invention, the following examples of certain aspects of some embodiments are given. In no way should the following examples be read to limit, or define, the entire scope of the invention.

EXAMPLES

Three exemplary methods were tested of affecting the acidic sites on sand and synthetic proppants. In the first method, sand was soaked in 0.1M NaOH overnight. The NaOH was poured off the sand and then the sand was mixed with $CaCO_3$. Tripropyl orthoformate ("TPOF") was then mixed with ADAPTA HP available from Halliburton Energy Services, at various locations (methyl styrene acrylate copolymer) until a thick gel formed. The TPOF mixture was stirred into the sand-$CaCO_3$ mixture until evenly dispersed. The sand was transferred to the bottom of an Erlenmyer flask, and then 97 ml of water and 3 ml 2M NaOH (as an inhibitor) was poured on top. The flask was sealed and placed in a 135° F. water bath. The flask was then monitored for $CO_2$ production because $CO_2$ production is believed to be indicative of the start of catalyzed acid production. FIG. 1, which is a graph that plots $CO_2$ Volume (ml) over time at 135° F., illustrates about a 5 hour delay using additional NaOH as an inhibitor.

Figure 2:
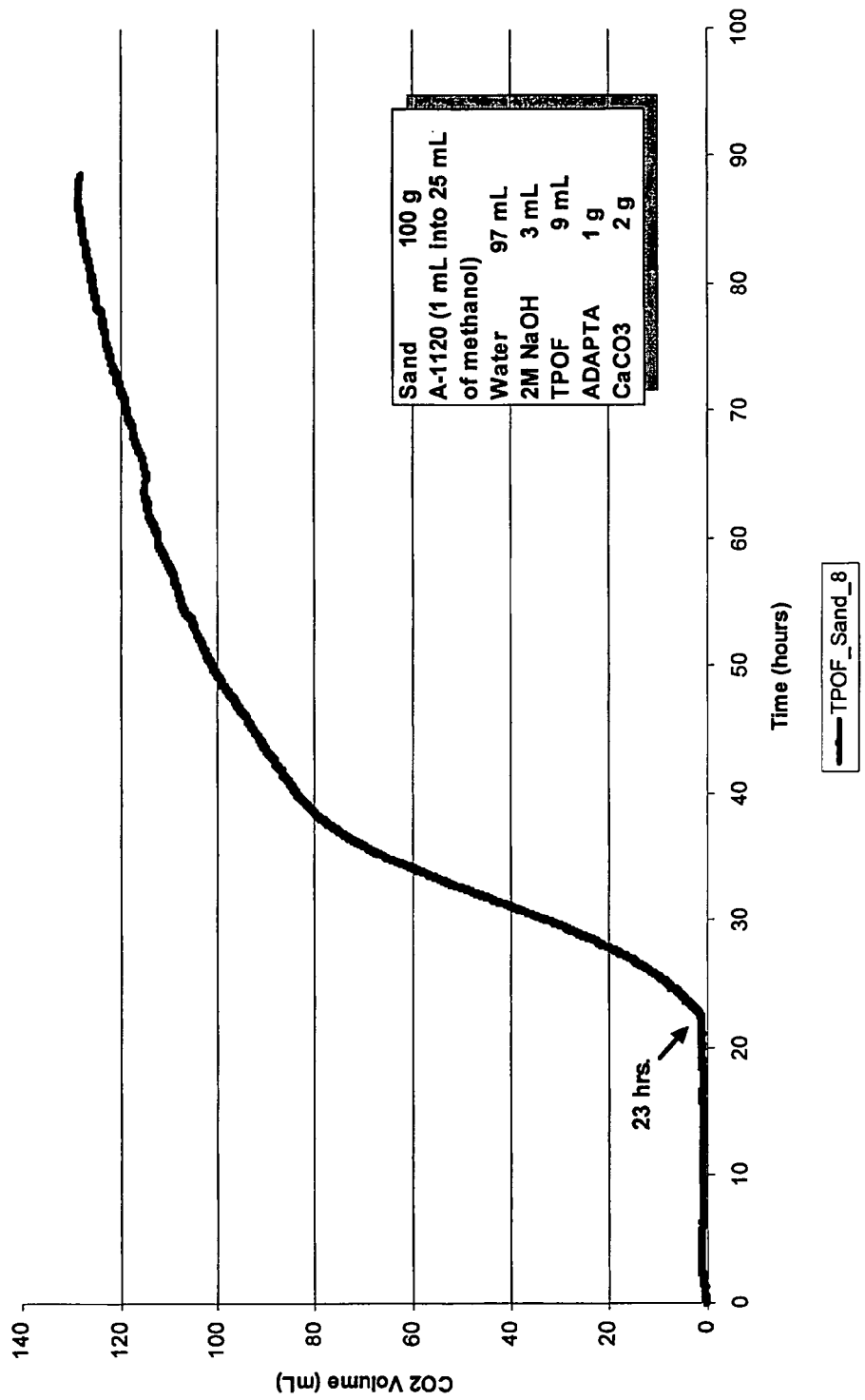
FIG. 2 is a graph depicting $CO_2$ production over time.

In the second method, sand was placed in a beaker. Siliquest® A-1120, which is a diaminofunctional silane and which is available from GE Silicones—OSi Specialties was mixed, into methanol and then stirred into the sand. The beaker was placed on a heating plate and the methanol was allowed to evaporate off. $CaCO_3$ was mixed into the sand. The TPOF was mixed with the viscosifier into a gel and then stirred into the sand until evenly dispersed. The sand was transferred to the bottom of an Erlenmyer flask, and the water was poured on top. The flask was sealed and placed in a 135° F. water bath and monitored for $CO_2$ production. FIG. 2 illustrates the sand test with added NaOH as an inhibitor. About a 23 hour delay was observed.

Figure 3:
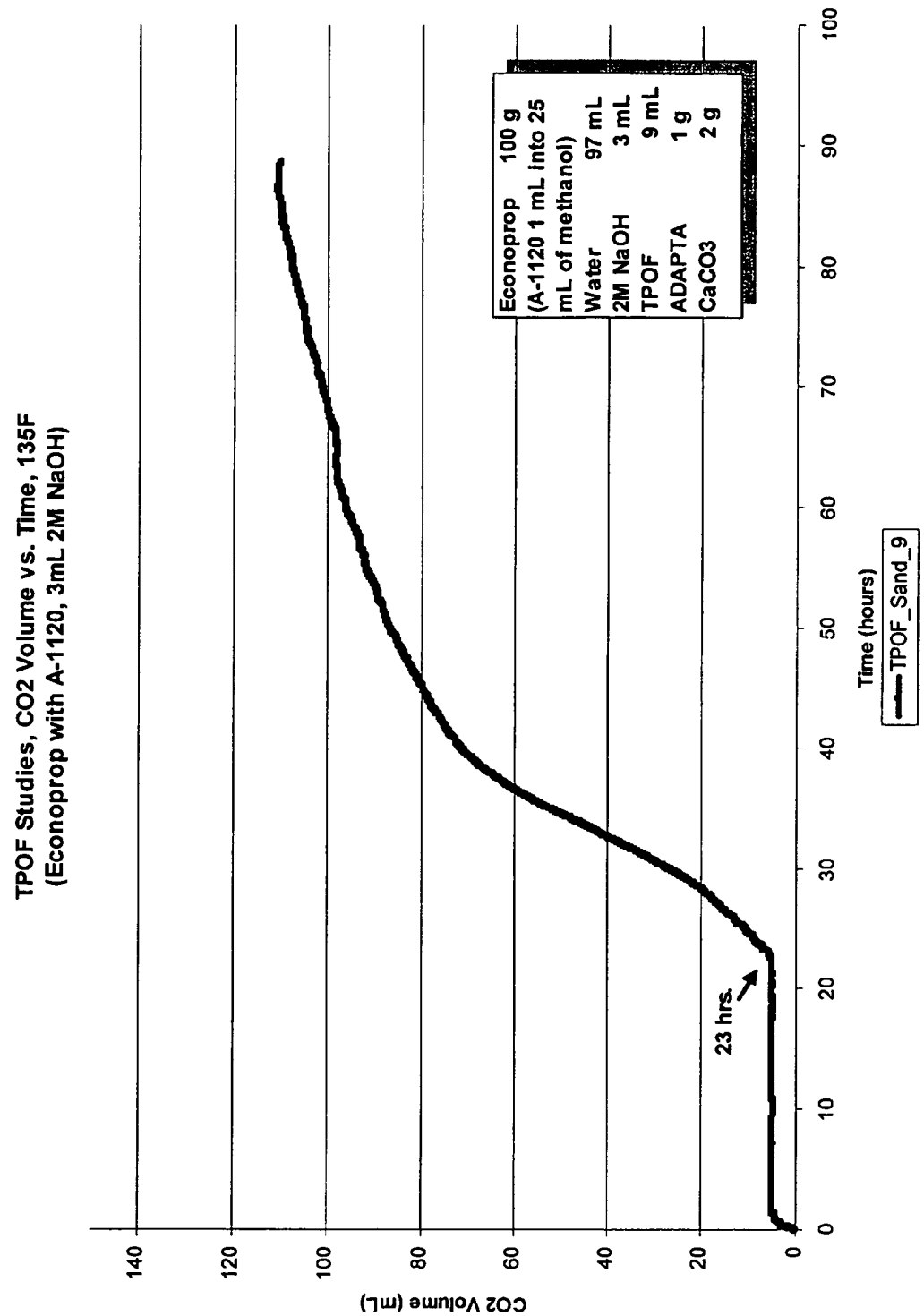
FIG. 3 is a graph depicting $CO_2$ production over time.

In another example, Econoprop, available from Carboceramics, Inc. at www.carboceramics.com, was used instead of sand. Siliquest® A-1120, which is available from GE Silicones—OSi Specialties, was mixed into methanol and then stirred into the Econoprop. The beaker was placed on a heating plate and the methanol was allowed to evaporate off. $CaCO_3$ was mixed into the Econoprop. The TPOF was mixed with the viscosifier into a gel and then stirred into the Econoprop until evenly dispersed. The Econoprop was transferred to the bottom of an Erlenmyer flask, and the water was poured on top. The flask was sealed and placed in a 135° F. water bath and monitored for $CO_2$ production. FIG. 3 illustrates the Econoprop test with added NaOH as an inhibitor. About a 23 hour delay was observed.

Figure 4:
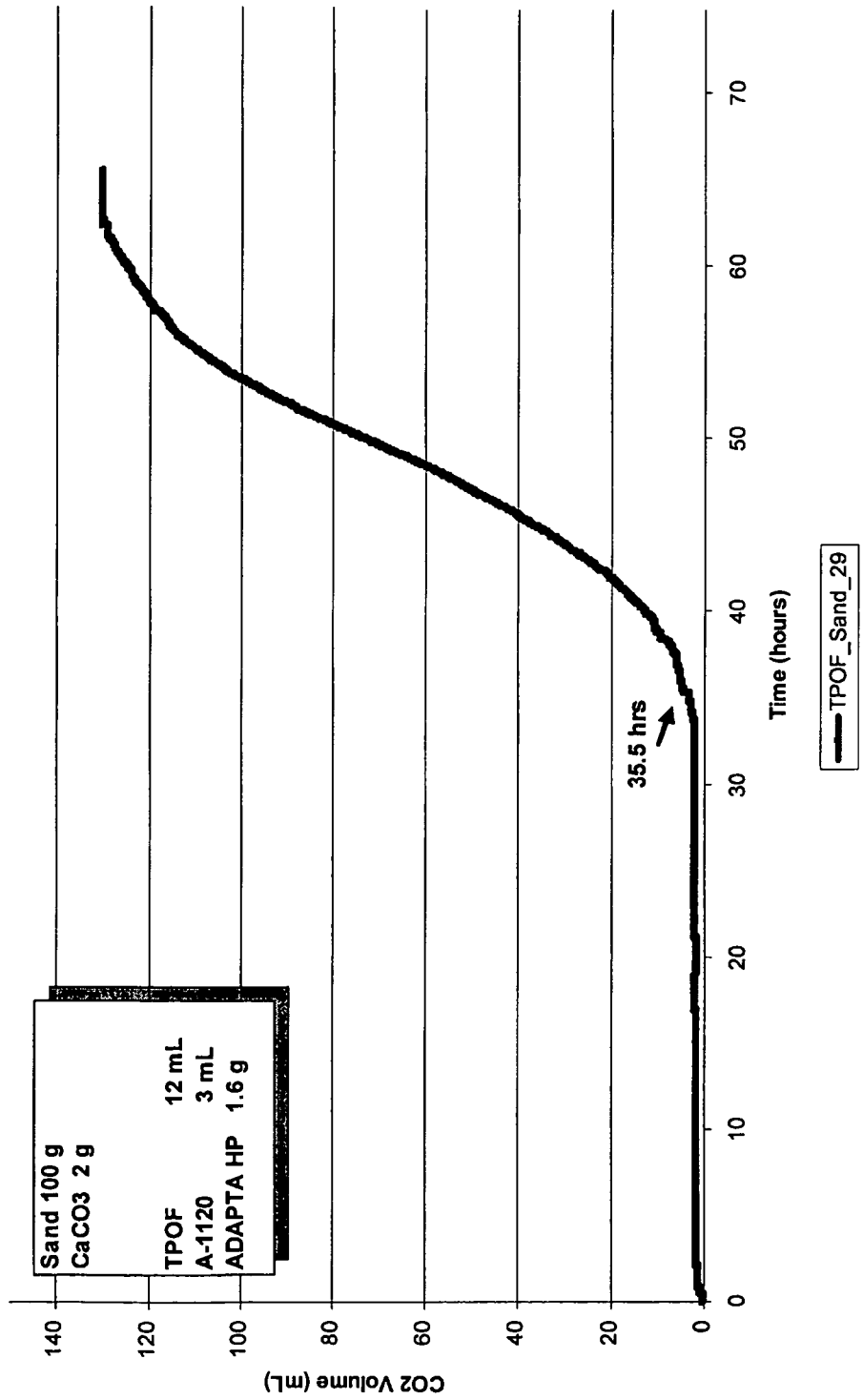
FIG. 4 is a graph depicting $CO_2$ production over time.
Figure 5:
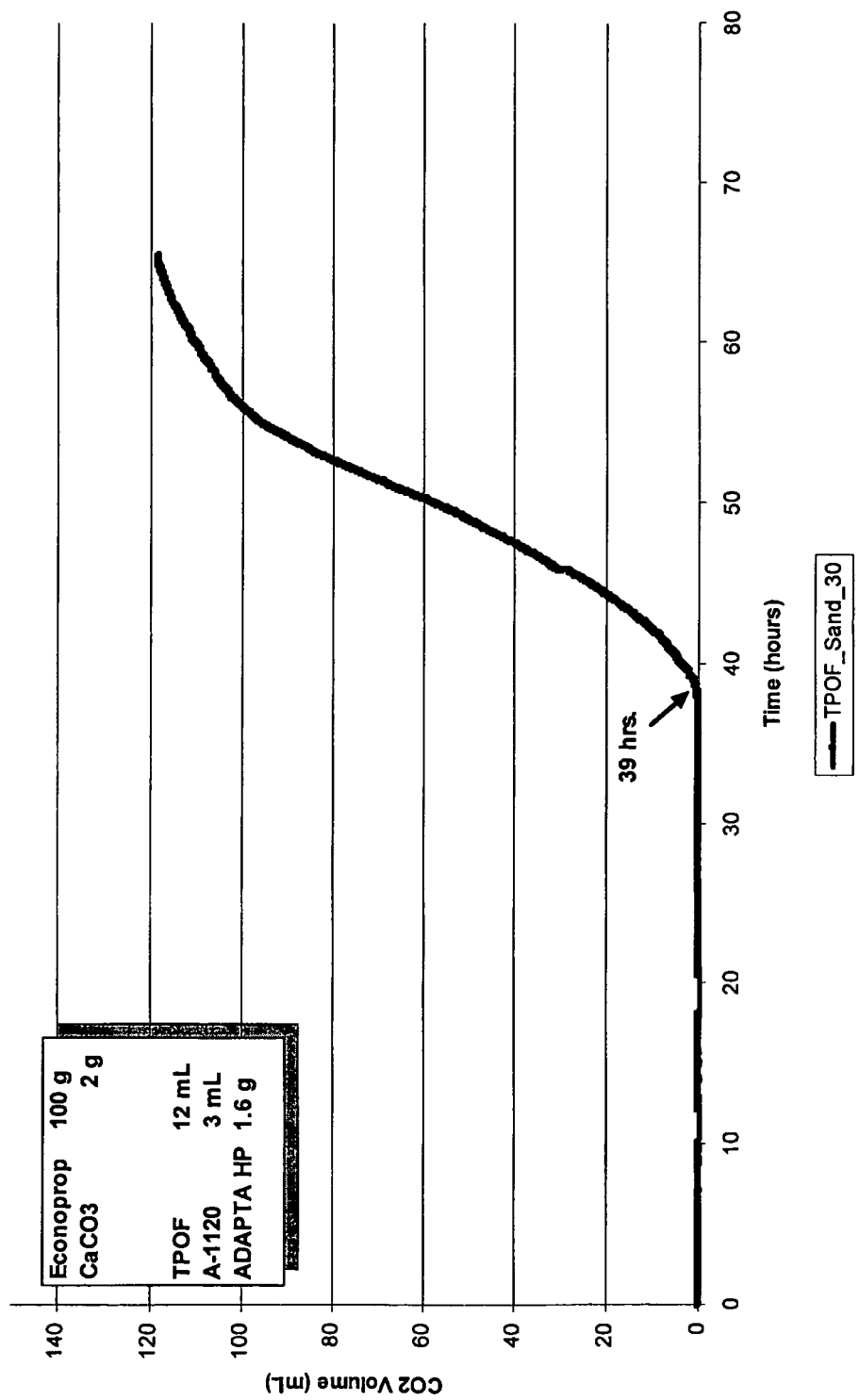
FIG. 5 is a graph depicting $CO_2$ production over time.

In another method, Siliquest® A-1120 was added into the TPOF gel mixture before coating the gel onto the sand or Econoprop and mixing it with $CaCO_3$. The sand or Econoprop mixture was then transferred to the bottom of an Erlenmyer flask, and then water was poured on top. The flasks were then sealed, and placed in 135° F. water baths, and monitored for $CO_2$ production. FIG. 4 illustrates a sand test in which the Siliquest® A-1120 was mixed into the gelled TPOF and then stirred into the sand. About a 35.5 hour delay was observed. FIG. 5 illustrates the Econoprop test and the gelled Siliquest® A-1120 TPOF mixture coated onto the Econoprop. About a 39 hour delay was observed.

Figure 6:
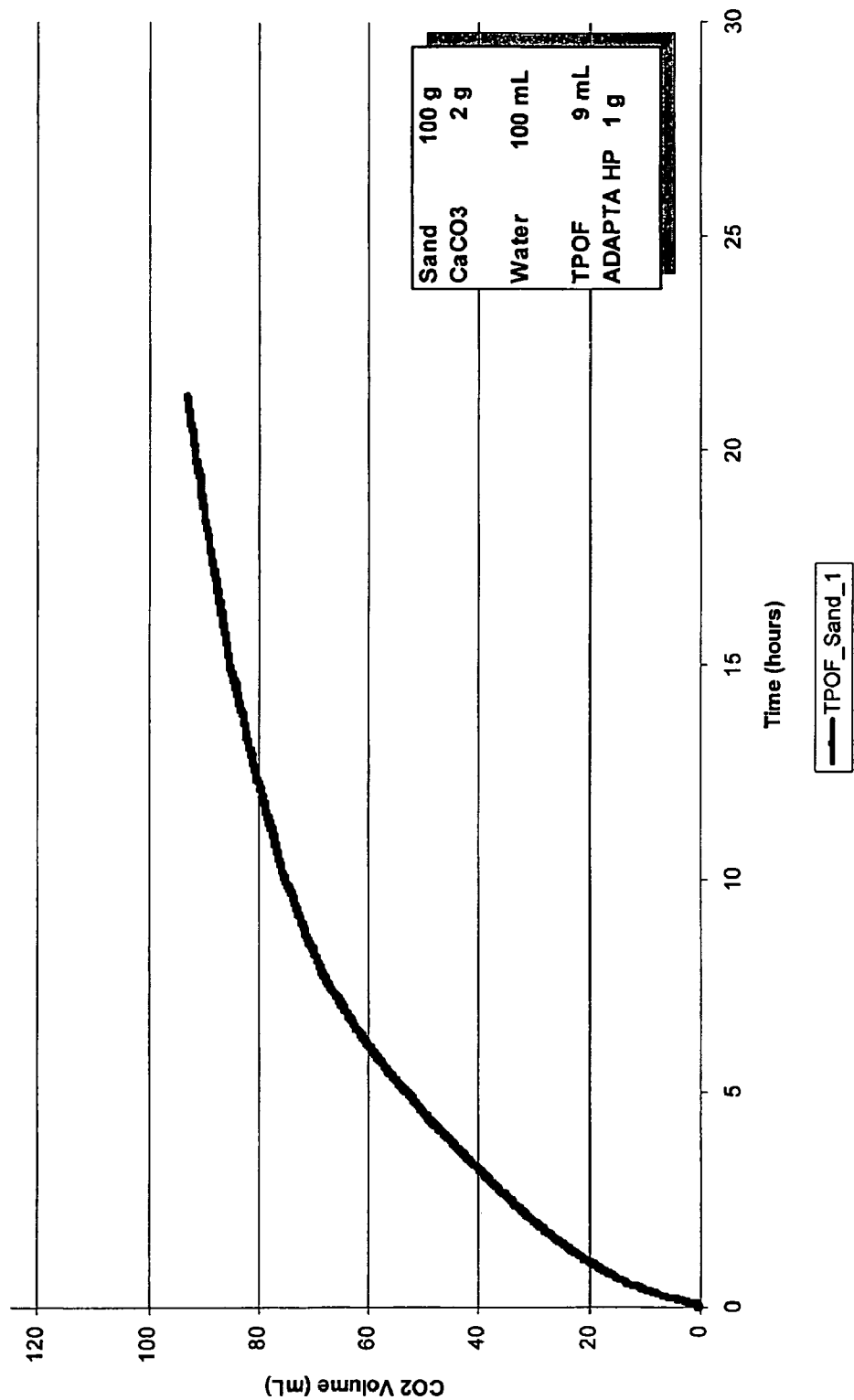
FIG. 6 is a graph depicting $CO_2$ production over time.

As a comparative example, a test was run in which sand and no Siliquest® A-1120 or NaOH was used to affect the acidic sites on the sand. FIG. 6 illustrates that the hydrolysis of the TPOF is much faster than when Siliquest® A-1120 or NaOH is used. The hydrolysis appears to be relatively immediate.

Figure 7:
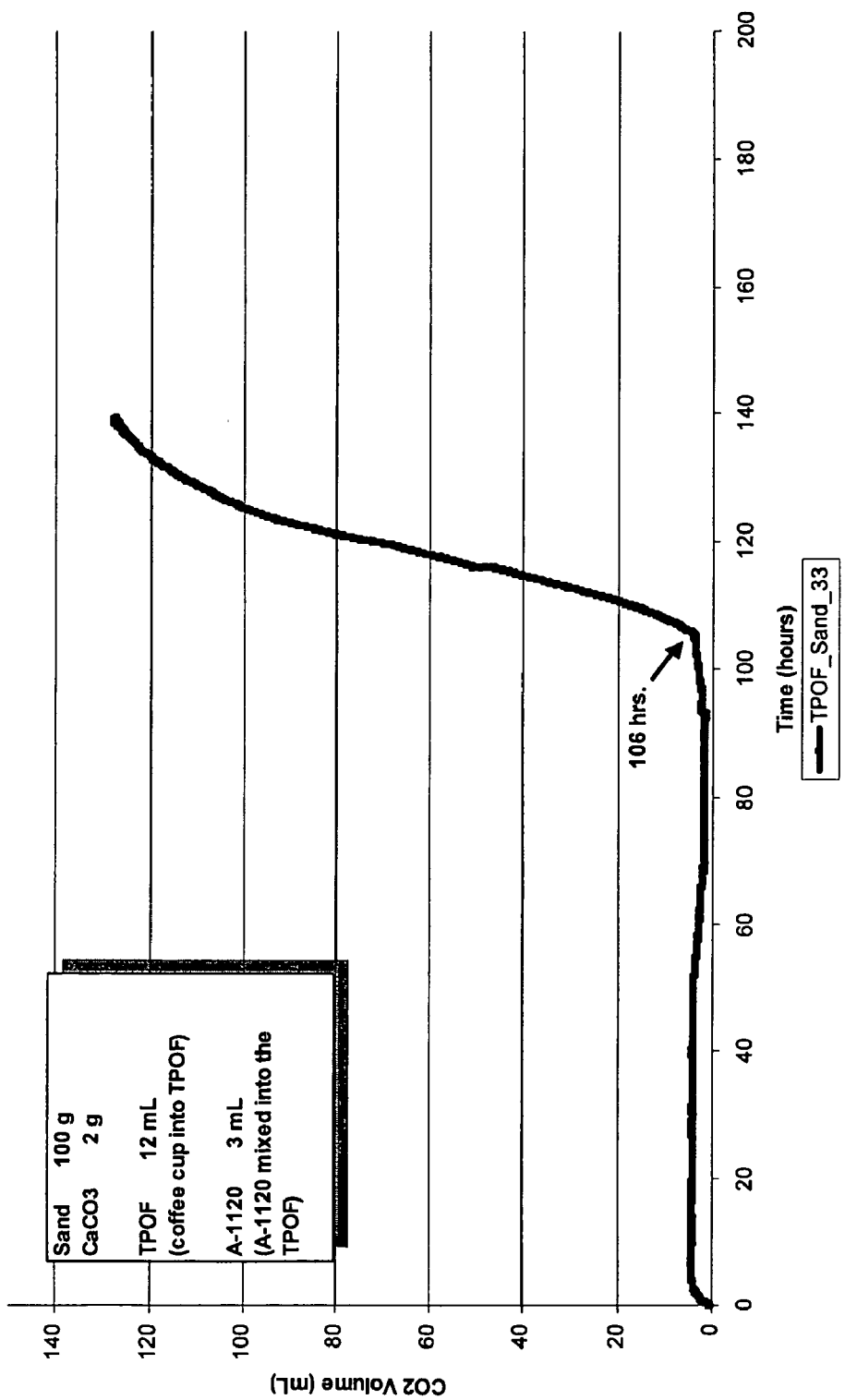
FIG. 7 is a graph depicting $CO_2$ production over time.

In another test, 3.4 g of polystyrene was dissolved in 10.5 g of orthoester. The viscosified orthoester was mixed into 100 g of sand. $CaCO_3$ was mixed into the sand. The sand was transferred to the bottom of an Erlenmyer flask, and the water was poured on top. The flask was sealed and placed in a 135° F. water bath and monitored for $CO_2$ production. FIG. 7 illustrates about a 106 hour delay.

Figure 8:
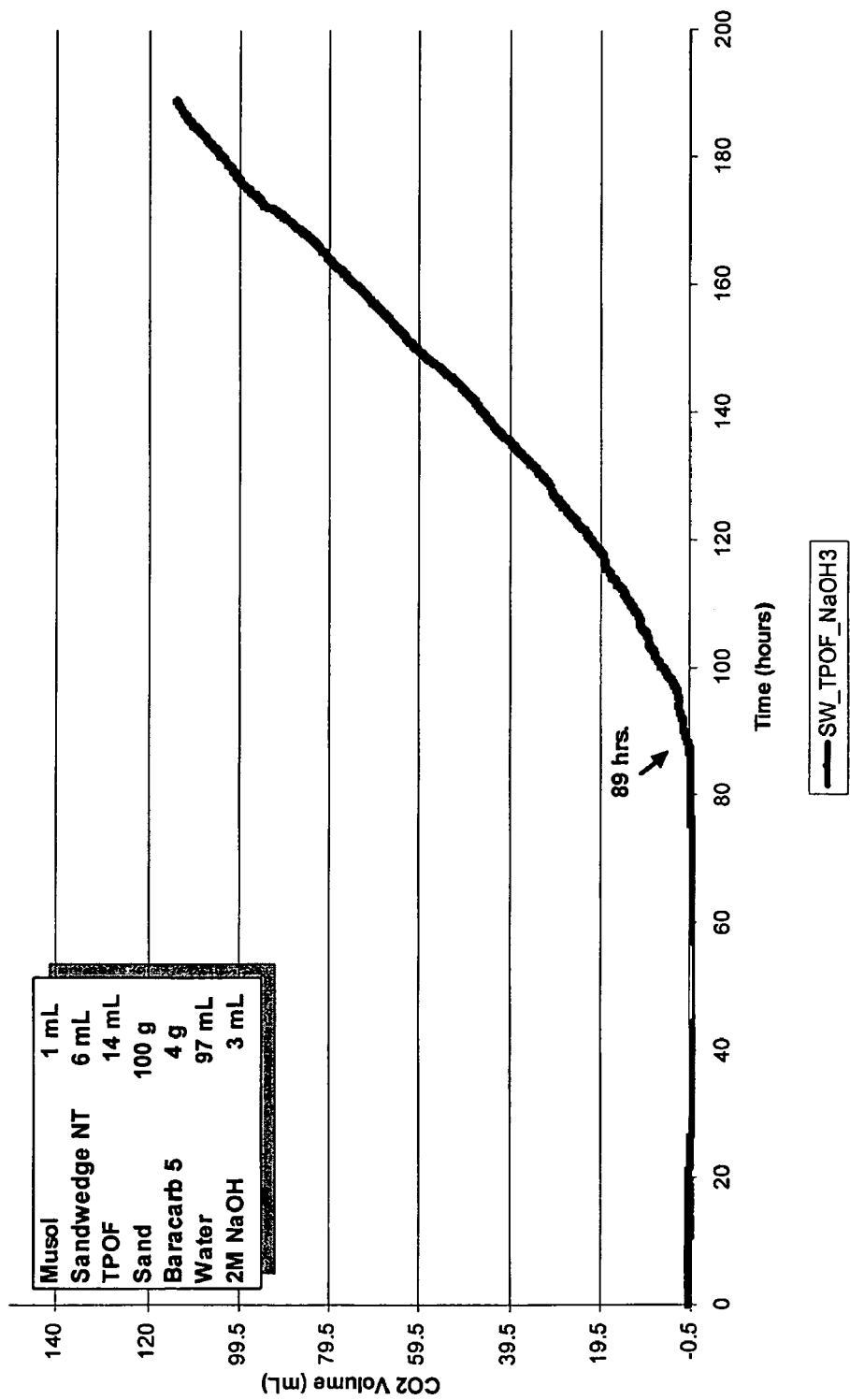
FIG. 8 is a graph depicting $CO_2$ production over time.

In another test, 6 mL SANDWEDGE NT (a tackifying agent available from Halliburton Energy Services, Inc. in Duncan, Okla.) was mixed with 1 mL MUSOL (a mutual solvent available from Halliburton Energy Services in Duncan, Okla.). 14 mL orthoester was dissolved in the Sandwedge/Musol solution. The mixtures was combined with 100 g of sand. $CaCO_3$ was mixed into the sand. The sand was transferred to the bottom of an Erlenmyer flask, and the water was poured on top. The flask was sealed and placed in a 135° F. water bath and monitored for $CO_2$ production. FIG. 8 illustrates about an 89 hour delay.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing a treatment fluid that comprises a base fluid and coated particulates, the coated particulates having been treated with a surface modification agent and then coated with a hydrolysable coating, wherein the surface modification agent is essentially free of a resin and a tackifying agent, and wherein the surface modification agent comprises at least one surface modification agent selected from the group consisting of sodium hydroxide and an acidic site modifying compound; and
placing the treatment fluid into a subterranean formation via a well bore.

2. The method of claim 1 wherein the coated particulates include a particulate selected from the group consisting of: sand; bauxite; ceramic materials; glass materials; glass beads; polymer materials; cured resinous particulates that comprise nut shell pieces; cured resinous particulates that comprise seed shell pieces; cured resinous particulates that comprise fruit pit pieces; composite particulates that may comprise a filler selected from the group consisting of: silica, alumina, fumed carbon, carbon black, mica, titanium dioxide, kaolin, talc, zirconia, fly ash, hollow glass microspheres, solid glass, and combinations thereof; and combinations thereof.

3. The method of claim 1 wherein the coated particulates are present in the treatment fluid in an amount of from about 0.5 ppg to about 18 ppg of the treatment fluid.

4. The method of claim 1 wherein the surface modification agent is a sodium hydroxide solution.

5. The method of claim 1 wherein the surface modification agent comprises an acidic site modifying compound and optionally a solvent.

6. The method of claim 5 wherein the acidic site modifying compound is an organosilicon compound.

7. The method of claim 5 wherein the acidic site modifying compound is an aminofunctional silane, an ureidofunctional silane, an epoxyfunctional silane, an organohalogen silane, an organosilane ester, a silyl acetamide, a cyclosiloxane, a cyclosilazane, or a silazane.

8. The method of claim 5 wherein the solvent is a nonprotic organic solvent.

9. The method of claim 1 wherein the hydrolysable coating comprises a degradable polymer chosen from the group consisting of: aliphatic polyesters; poly(lactides); poly(glycolides); poly($\epsilon$-caprolactones); poly(hydroxybutyrates); polyanhydrides; aliphatic polycarbonates; orthoesters; poly(orthoesters); poly(amides); poly(urethanes); poly(hydroxy ester ethers); poly(phosphazenes); derivatives or combinations thereof.

10. The method of claim 1 wherein the hydrolysable coating is an orthoester coating that comprises an orthoester or polyorthoester chosen from the group consisting of: orthoacetates; trimethyl orthoacetate; triethyl orthoacetate; tripropyl orthoacetate; triisopropyl orthoacetate; tributyl orthoacetate; poly(orthoacetates); orthoformates; trimethyl orthoformate; triethyl orthoformate; tripropyl orthoformate; triisopropyl orthoformate; tributyl orthoformate; poly(orthoformates); orthopropionates; trimethyl orthopropionate; triethyl orthopropionate; tripropyl orthopropionate; triisopropyl orthopropionate; tributyl orthopropionate; poly(orthopropionates); and orthoesters of polyfunctional alcohols.

11. The method of claim 1 wherein the treatment fluid comprises one of the following group: a gelling agent; a crosslinking agent; a crosslinked gelling agent; a gel stabilizer; a breaker; a fluid loss control additive; an acid; a corrosion inhibitor; a catalyst; a clay stabilizer; a biocide; a salt; a friction reducer; a surfactant; a solubilizer; a pH adjusting agent; or a gas hydrate prevention additive.

12. A method comprising:
treating a particulate with a surface modification agent;
coating the particulate with a hydrolysable coating to produce a coated particulate, wherein the hydrolysable coating has an initial degradation rate with respect to the particulate prior to treatment with the surface modification agent;
placing the particulate in a subterranean formation; and
allowing the hydrolysable coating to degrade at a second degradation rate that is slower than its initial degradation rate.

13. The method of claim 12 wherein the surface modification agent or the coated particulate comprises a viscosifier or a tackifying agent.

14. The method of claim 13 wherein the tackifying agent is selected from the group consisting of: polyamides that are liquids or in solution at the temperature of the subterranean formation; condensation reaction products comprised of commercially available polyacids and a polyamine; polyesters, polycarbonates; polycarbamates; natural resins; and shellac.

15. The method of claim 12 wherein the surface modification agent is a sodium hydroxide solution.

16. The method of claim 12 wherein the surface modification agent comprises an acidic site modifying compound and optionally a solvent.

17. The method of claim 16 wherein the acidic site modifying compound is an aminofunctional silane, an ureidofunctional silane, an epoxyfunctional silane, an organohalogen silane, an organosilane ester, a silyl acetamide, a cyclosiloxane, a cyclosilazane, or a silazane.

18. The method of claim 16 wherein the solvent is a nonprotic organic solvent.

19. The method of claim 12 wherein the hydrolysable coating comprises a degradable polymer chosen from the group consisting of: aliphatic polyesters; poly(lactides); poly(glycolides); poly($\epsilon$-caprolactones); poly(hydroxybutyrates); polyanhydrides; aliphatic polycarbonates; orthoesters; poly(orthoesters); poly(amides); poly(urethanes); poly(hydroxy ester ethers); poly(phosphazenes); derivatives or combinations thereof.

20. The method of claim 12 wherein the hydrolysable coating is an orthoester coating that comprises an orthoester or polyorthoester chosen from the group consisting of: orthoacetates; trimethyl orthoacetate; triethyl orthoacetate; tripropyl orthoacetate; triisopropyl orthoacetate; tributyl orthoacetate; poly(orthoacetates); orthoformates; trimethyl orthoformate; triethyl orthoformate; tripropyl orthoformate; triisopropyl orthoformate; tributyl orthoformate; poly(orthoformates); orthopropionates; trimethyl orthopropionate; triethyl orthopropionate; tripropyl orthopropionate; triIsopropyl orthopropionate; tributyl orthopropionate; poly(orthopropionates); and orthoesters of polyfunctional alcohols.

21. A method comprising:
providing a fracturing fluid that comprises a base fluid and coated particulates, the coated particulates having been treated with a surface modification agent and coated with a hydrolysable coating, wherein the surface modification agent is essentially free of a resin and a tackifying agent, and wherein the surface modification agent comprises at least one surface modification agent selected from the group consisting of sodium hydroxide and an acidic site modifying compound;

placing the fracturing fluid into a subterranean formation via a well bore at a pressure sufficient to create or enhance a fracture in the subterranean formation; and allowing the coated particulates to be placed in or around the fracture.

22. A method comprising:

providing a treatment fluid that comprises a base fluid and coated particulates, the coated particulates having been treated with a sodium hydroxide solution and then coated with a hydrolysable coating and placing the treatment fluid into a subterranean formation.

* * * * *